(12) United States Patent
Shishkov et al.

(10) Patent No.: US 9,114,380 B2
(45) Date of Patent: Aug. 25, 2015

(54) CONDITIONING OF DOUBLE METAL CYANIDE CATALYSTS

(75) Inventors: Igor Shishkov, Mannheim (DE); Sirus Zarbakhsh, Birkenheide (DE); Ronald Adelmann, Darmstadt (DE); Wolfgang Rohde, Speyer (DE); Achim Loeffler, Speyer (DE)

(73) Assignee: BASF SE, Ludwigshafen (DE)

( * ) Notice: Subject to any disclaimer, the term of this patent is extended or adjusted under 35 U.S.C. 154(b) by 560 days.

(21) Appl. No.: 13/502,816

(22) PCT Filed: Oct. 1, 2010

(86) PCT No.: PCT/EP2010/006002
§ 371 (c)(1),
(2), (4) Date: Apr. 19, 2012

(87) PCT Pub. No.: WO2011/047780
PCT Pub. Date: Apr. 28, 2011

(65) Prior Publication Data
US 2012/0253005 A1  Oct. 4, 2012

(30) Foreign Application Priority Data
Oct. 19, 2009  (EP) .................................. 09013148

(51) Int. Cl.
*B01J 27/26* (2006.01)
*B01J 37/10* (2006.01)
*C08G 65/26* (2006.01)

(52) U.S. Cl.
CPC *B01J 27/26* (2013.01); *B01J 37/10* (2013.01); *C08G 65/2609* (2013.01); *C08G 65/2663* (2013.01)

(58) Field of Classification Search
USPC .......................................... 502/170, 175, 159
See application file for complete search history.

(56) References Cited

U.S. PATENT DOCUMENTS

| | | | |
|---|---|---|---|
| 3,829,505 A | 8/1974 | Herold | |
| 4,472,560 A | 9/1984 | Kuyper et al. | |
| 4,477,589 A | 10/1984 | Van Der Hulst et al. | |
| 5,470,813 A | 11/1995 | Le-Khac | |
| 5,482,908 A | 1/1996 | Le-Khac | |
| 5,627,120 A | 5/1997 | Le-Khac | |
| 5,689,012 A * | 11/1997 | Pazos et al. | 568/619 |
| 5,714,639 A | 2/1998 | Bowman et al. | |
| 5,789,626 A | 8/1998 | Le-Khac | |
| 5,998,672 A | 12/1999 | Soltani-Ahmadi et al. | |
| 6,303,833 B1 | 10/2001 | Grosch et al. | |
| 6,376,420 B1 | 4/2002 | Ooms et al. | |
| 6,486,361 B1 | 11/2002 | Ehlers et al. | |
| 6,613,714 B2 | 9/2003 | Grosch et al. | |
| 6,689,710 B2 | 2/2004 | Grosch et al. | |
| 6,869,905 B1 | 3/2005 | Dexheimer | |
| 7,470,823 B2 | 12/2008 | Stoesser et al. | |
| 2002/0177523 A1 | 11/2002 | Kim et al. | |
| 2002/0193245 A1 | 12/2002 | Dexheimer et al. | |
| 2004/0242937 A1 | 12/2004 | Baum et al. | |
| 2004/0249221 A1 | 12/2004 | Bohres et al. | |
| 2005/0159627 A1 | 7/2005 | Stosser et al. | |
| 2005/0203274 A1 | 9/2005 | Bohres et al. | |
| 2007/0203367 A1 | 8/2007 | Kim et al. | |
| 2007/0276099 A1 | 11/2007 | Lorenz et al. | |
| 2008/0300376 A1 | 12/2008 | Triller et al. | |
| 2010/0125126 A1 | 5/2010 | Lorenz et al. | |

FOREIGN PATENT DOCUMENTS

| | | |
|---|---|---|
| DE | 197 42 978 | 4/1999 |
| DE | 198 09 538 | 9/1999 |
| EP | 1 079 926 | 3/2001 |
| EP | 1 194 231 | 4/2002 |
| EP | 1 288 244 | 3/2003 |
| EP | 1 290 060 | 3/2003 |
| EP | 1 799 344 | 6/2007 |
| EP | 1 859 863 | 11/2007 |
| WO | 98 16310 | 4/1998 |
| WO | 99 56874 | 11/1999 |
| WO | 00 74845 | 12/2000 |
| WO | 01 10933 | 2/2001 |
| WO | 01 64772 | 9/2001 |
| WO | 03 029326 | 4/2003 |
| WO | 03 066706 | 8/2003 |
| WO | 2004 022227 | 3/2004 |
| WO | 2005 094989 | 10/2005 |
| WO | 2008 095853 | 8/2008 |

OTHER PUBLICATIONS

International Search Report Issued Mar. 24, 2011 in PCT/EP10/06002 Filed Oct. 1, 2010.

* cited by examiner

*Primary Examiner* — Elizabeth Wood
(74) *Attorney, Agent, or Firm* — Oblon, McClelland, Maier & Neustadt, L.L.P.

(57) ABSTRACT

The invention relates to a method for conditioning double metal catalysts which are used in the production of polyether polyols. The conditioning enhances the performance of the catalyst, so that lower concentrations of the DMC catalyst can be used in polyether polyol production.

20 Claims, No Drawings

CONDITIONING OF DOUBLE METAL CYANIDE CATALYSTS

FIELD OF THE INVENTION

The invention relates to a method for conditioning double metal catalysts which are used in the production of polyether polyols. The conditioning enhances the performance of the catalyst, so that lower concentrations of the DMC catalyst can be used in polyether polyol production.

BACKGROUND OF THE INVENTION

Polyether polyols are important intermediates utilized to manufacture a wide range of products, including polyurethanes. Polyether polyols are produced by polymerization of epoxides, e.g., propylene or ethylene oxide. It is known that double metal catalysts (DMC catalysts) are effective polymerization catalysts, producing polyols with narrow molecular weight distribution, low viscosity and low unsaturation.

DMC catalysts are normally prepared by combining an aqueous solution of a metal salt and an aqueous solution of a complex metal cyanide salt. For example, U.S. Pat. Nos. 5,470,813 and 5,714,639 describe preparation of DMC by combining an aqueous solution of $ZnCl_2$ (excess) with an agueous solution of $K_3Co(CN)_6$. The desired DMC catalyst, in this case specifically $Zn_3[Co(CN)_6]_2$, precipitates from the mixture.

US 2002/193245 A1 describes one-step preparation of DMC catalysts by combining the aqueous solution of the first metal salt, e.g. $ZnCl_2$, with the aqueous solution of the second metal salt, e.g. $CoCl_2$, and the aqueous solution of the alkali metal cyanide, e.g. KCN, in a single step to synthesize the DMC catalyst, in this case specifically $Zn_3[Co(CN)_6]_2$.

Other methods for DMC catalyst synthesis are described in U.S. Pat. No. 4,472,560, U.S. Pat. No. 4,477,589, U.S. Pat. No. 5,627,120, U.S. Pat. No. 5,482,908, U.S. Pat. No. 5,789,626, U.S. Pat. No. 6,376,420 B1, U.S. Pat. No. 6,869,905 B1, EP 1 079 926 A1, EP 1 194 231 A1, EP 1 290 060 A1, WO 2005/094989 A1, US 2002/0177523, US 2007/0203367 A1, DE 198 09 538 A1, and WO 99/56874 A1.

Crystalline DMC catalysts are disclosed in U.S. Pat. No. 6,303,833 B1, U.S. Pat. No. 6,613,714 B2, U.S. Pat. No. 6,689,710 B2, U.S. Pat. No. 7,470,823 B2, US 2004/249221 A1, US 2005/0203274 A1, and US 2008/300376 A1.

Although DMC catalysts, for instance those described in U.S. Pat. No. 6,689,710 B2 or US 2004/0249221 A1, display high activity and afford polyether polyols with low unsaturation level, various attempts have been made to further increase catalyst activity, in order to be able to use smaller catalyst concentrations in the polyol production process and avoid an increase in the viscosity of the resulting polyols at DMC catalyst concentrations below 100 ppm.

Modifications to the process of catalyst preparation include continuous preparation of crystalline DMC catalysts via a mixing nozzle (EP 1 799 344 A1), preparation of the DMC catalyst in ionic liquids (WO 2008/095853 A1), or spray-drying the catalyst (WO 2004/022227 A1).

In order to increase catalyst activity, a number of conditioning methods have been proposed. US 2004/0242937 A1 teaches conditioning of a crystalline DMC catalyst by ultrasonic irradiation, in order to effect deagglomeration of the catalyst particles. WO 03/029326 A1 describes conditioning of the DMC catalyst at 80-130° C. in the reactor prior to the polymerization.

EP 1 288 244 A1 discloses a process wherein a substantially crystalline double metal cyanide catalyst is subjected to a contact treatment by heating the catalyst with an aqueous solution containing an organic ligand and a metal salt at temperatures from 45 to 125° C., and then separating the resuiting solid from the obtained slurry.

SUMMARY

It has now been found that DMC catalysts having increased activity in polyether polyol production by ring-opening polymerisation of epoxides are obtained when the DMC catalysts are subjected to hydrothermal treatment prior to being used in the polymerisation process.

DETAILED DESCRIPTION

The present invention provides a method for conditioning a DMC catalyst, comprising heating a suspension of the DMC catalyst in a dispersing medium under a gas atmosphere at a temperature in the range of from 140 to 270° C., and a pressure of 1 to 300 bar, for a period of time in the range of from 1 min to 24 hrs.

The double metal cyanide catalyst has the formula:

$$M^1{}_a[M^2(CN)_b(A)_c]_d fM^1{}_g X_n h(H_2O) eL kP \qquad (I)$$

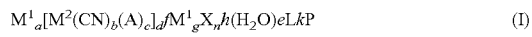

wherein
$M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $La^{3+}$, $Ce^{3+}$, $Ce^{4+}$, $Eu^{3+}$, $Mg^{2+}$, $Ti^{3+}$, $Ti^{4+}$, $Ag^+$, $Rh^{1+}$, $Ru^{2+}$, $Ru^{3+}$, $Pd^{2+}$;
$M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$;
and $M^1$ and $M^2$ are different;
A is an anion selected from the group consisting of halide, hydroxide, sulfate, carbonate, cyanide, thiocyanate, isocyanate, cyanate, carboxylate, oxalate and nitrate;
X is an anion selected from the group consisting of halide, hydroxide, sulfate, carbonate, cyanide, thiocyanate, isocyanate, cyanate, carboxylate, oxalate and nitrate;
L is a water-miscible ligand selected from the group consisting of alcohols, aldehydes, ketones, ethers, polyethers, esters, polyesters, polycarbonate, ureas, amides, nitriles and sulfides and mixtures thereof;
P is an organic additive selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylene imines, maleic acid and maleic anhydride copolymers, hydroxyethyl cellulose, polyacetates, ionic surface-active and interface-active compounds, bile acids and their salts, esters and amides, carboxylic esters of polyhydric alcohols and glycosides;
a, b, d, g and n are integers or fractions greater than zero, c, f, e, h and k are integers or fractions greater than or equal to zero, with at least one number being different from zero; with the proviso that a, b, c, and d, and also g and n are chosen so that the compound is electrically neutral.

In a preferred embodiment, f and k only are equal to zero when c is not zero and A is carboxylate, oxalate, or nitrate.

The catalyst can be crystalline or amorphous. When k is zero, crystalline double metal cyanide compounds are preferred. When k is greater than zero, both crystalline, partially crystalline and substantially amorphous catalysts are preferred.

In one embodiment, the catalyst of the formula (I) has a value of k which is greater than zero. The catalyst then comprises at least one multimetal cyanide compound; at least one organic ligand L; and at least one organic additive P.

In another embodiment, k is zero or has a value so that the content of the component P is not more than 4% by weight, based on the compound of the formula (I). If desired, e is also zero and X is exclusively carboxylate, preferably formate, acetate or propionate.

In another embodiment, f is greater than zero, preferably in the range from zero to 6. In this embodiment, in which a metal salt is present in the DMC catalyst, the catalyst has a structure which displays a particularly high catalytic activity. In this embodiment, the DMC catalyst preferably has a crystalline structure.

In another embodiment of the DMC catalyst, f, e and k are different from zero. In this case, the DMC catalysts contain a water-miscible organic ligand, generally in an amount of from 0.5 to 30% by weight, and an organic additive, for example a polyether alcohol, generally in an amount of from 5 to 80% by weight, as described, e.g., in WO 98/16310 A1, incorporated herein by reference.

In one embodiment, the double metal cyanide catalyst is crystalline and has a platelet-like morphology. Such catalysts are described in WO 00/74845, incorporated herein by reference.

In one embodiment, $M^1$ is $Zn^{2+}$ and $M^2$ is $Co^{3+}$, i.e. the multimetal cyanide compound is a zinc hexacyanocobaltate. Particular preference is given to crystalline multimetal cyanide compounds in which the anion X is formate, acetate or propionate and f is greater than 0, and which exhibit X-ray diffraction patterns as described in DE 197 42 978 A1, incorporated herein by reference. Among these compounds, preference is in turn given to those in which the anion X is acetate and in particular to those which crystallize in a monoclinic crystal system.

Among these multimetal cyanide compounds in which $M^1$ is $Zn^{2+}$, $M^2$ is $Co^{3+}$, and X is acetate and which have a monoclinic crystal system, there are further preferred embodiments in respect of the morphology of the primary crystals. Preference is given to platelet-shaped multimetal cyanide compounds, i.e. multimetal cyanide compounds in which the length and width of the primary crystallites are at least three times as great as the thickness of the primary crystallites.

Crystalline DMC catalysts which can be used in the process of the invention are also disclosed in U.S. Pat. No. 6,303,833 B1, U.S. Pat. No. 6,613,714 B2, U.S. Pat. No. 6,689,710 B2, U.S. Pat. No. 7,470,823 B2, US 2004/249221 A1, US 2005/0203274 A1, and US 2008/0300376 A1, all incorporated herein by reference.

In one embodiment, the DMC catalysts are prepared by combining a metal salt solution with a cyanometalate solution, with the solutions optionally containing an organic ligand L and an organic additive P. The organic ligand and optionally the organic additive are subsequently added.

In one embodiment of the preparation of the DMC catalyst, an inactive multimetal cyanide phase is prepared first and is subsequently converted into an active multimetal cyanide phase by recrystallization, for example by means of a change in the pH of the precipitation solution, by means of a temperature increase or by addition of further starting solution, as described in WO 01/64772 A1, incorporated herein by reference.

The precipitated catalyst can be isolated by filtration or centrifugation and be dried under reduced pressure. The dried catalyst is then milled, for example as described in U.S. Pat. No. 3,829,505 and U.S. Pat. No. 5,714,639, both incorporated herein by reference. However, the catalyst can also be dried by spray-drying or freeze-drying, as described, for example, in U.S. Pat. No. 5,998,672 or WO 2004/22227 A1, both incorporated herein by reference.

In order to control the surface area of the DMC catalyst prepared, it is advantageous to carry out the preparation of the catalysts in the presence of at least one surface-active compound, in addition to the measures described above. In particular, use is made of non-ionic and/or polymeric surfactants. Among this group, particular preference is given to fatty alcohol alkoxylates, block copolymers of various epoxides having differing hydrophilicity, castor oil alkoxylates or block copolymers of epoxides and other monomers, e.g. acrylic acid or methacrylic acid. Suitable surface-active compounds are, for example, alkylene oxide block polymers, in particular bifunctional ethylene oxidepropylene oxide copolymers. The substances used should have a moderate to good solubility in water.

Suitable fatty alcohol alkoxylates can be prepared by reacting a fatty alcohol, preferably one having 8-36 carbon atoms, in particular 10-18 carbon atoms, with ethylene oxide, propylene oxide and/or butylene oxide. The polyether part of the fatty alcohol alkoxylate used according to the present invention can consist of pure ethylene oxide, propylene oxide or butylene oxide polyethers. Also possible are copolymers of two or three different alkylene oxides or block copolymers of two or three different alkylene oxides. Fatty alcohol alkoxylates which have pure polyether chains are, for example, the Lutensol® AO products from BASF SE. Examples of fatty alcohol alkoxylates having block copolymers as polyether part are Plurafac® LF products from BASF SE. The polyether chains particularly preferably consist of from 2 to 50, in particular 3-15, alkylene oxide units.

Suitable block copolymers may comprise ethylene oxide and propylene oxide (Pluronic® products, BASF SE). The solubility in water is controlled via the lengths of the various blocks. The molar masses of these compounds are usually in the range from 500 Da to 20,000 Da, preferably from 1000 Da to 6000 Da and in particular 1500-4000 Da. In the case of ethylene oxide/propylene oxide copolymers, the ethylene oxide content is from 5 to 50% by weight and the propylene oxide content is from 50 to 95% by weight.

Suitable alkylene oxide copolymers with other monomers preferably have ethylene oxide blocks. Other monomers can be, for example, butyl methacrylate, methyl methacrylate or methacrylic acid The surface-active compounds are generally not incorporated into the structure of the multimetal cyanide compounds nor bound in the form of a complex and can be washed out after the multimetal cyanide compounds have been prepared.

In another embodiment of the preparation of the DMC catalyst, a cyanometalic acid is used as the cyanometalate compound. This makes it possible to carry out the preparation without the formation of a salt which may have an unfavourable effect on the surface area of the DMC catalysts obtained.

In still another embodiment, the DMC catalyst is prepared in a single step by combining an aqueous solution of a first metal salt, e.g., $ZnCl_2$, with an aqueous solution of a second metal salt, e.g., $CoCl_2$, and an aqueous solution of an alkali metal cyanide, e.g., KCN, as taught by US 2002/193245 A1, incorporated herein by reference.

In the method of the present invention, a suspension of the DMC catalyst in a dispersing medium is used. As the dispersing medium, water, alcohols, esters, ethers, heteroatom-containing organic ligands, e.g. Pluronic® 6200, polyethers, polyesters, polyalcohols, polyetherols, propylene oxide/ethylene oxide copolymers, and/or their mixtures can be used.

In one embodiment of the process, the concentration of the DMC catalyst in the suspension is 0.05 to 90 wt. %, for instance 1 to 80 wt. %, 5 to 70 wt. %, 5 to 60 wt. % or even 10 to 60 wt. %.

In one embodiment, the DMC catalyst suspension is stirred during the conditioning process at 0 to 3,000 rpm, for instance 100 to 2,000 rpm, 200 to 1,000 rpm, or even 300 to 700 rpm.

In one embodiment, the DMC catalyst suspension is stirred during the conditioning process using a stirring power of 0 to 5 W/l, for instance, 0 to 1 W/l, 0 to 0.5 W/l, or even 0 to 0.1 W/l.

The conditioning process is conducted under a gas atmosphere. Examples of suitable gases are nitrogen, carbon monoxide, carbon dioxide, water, and noble gases like helium, neon, argon, or xenon. When water is used as the dispersing medium, some steam is generated when the mixture is heated. The conditioning process can be carried out under the resulting inherent pressure, or additional pressure can be generated by pressurizing the reaction vessel with a suitable gas. In one particular embodiment, nitrogen is used to pressurize the reaction vessel. In another embodiment, the gas atmosphere is a mixture of nitrogen and water vapour.

The DMC catalyst is conditioned at a pressure of from 1 to 300 bar, for instance 1 to 200 bar, 3 to 180 bar, 3 to 160 bar, or even 10 to 160 bar.

The DMC catalyst is conditioned at a temperature in the range of from 140 to 270° C., for instance 140 to 210° C., 140 to 180° C., or even 150 to 180° C.

The DMC catalyst is conditioned for a period of time in the range of from 1 min to 24 hrs, for instance in the range of from 1 hr to 24 hrs, or even in the range of from 2 hrs to 18 hrs.

In one embodiment of the invention, the DMC catalyst is conditioned without first being isolated from the reaction mixture. The conditioning process can take place immediately after the synthesis of the catalyst. In case the synthesis step is conducted in a reactor that can be pressurized, conditioning may even performed in situ, without the need to transfer the reaction mixture to another vessel first.

In another embodiment, the DMC catalyst is isolated from the reaction mixture before the conditioning process. As mentioned above, the DMC catalyst can be isolated by filtration or centrifugation. Conditioning may be directly performed on the wet catalyst. Alternatively, the catalyst may be dried before the conditioning process, e.g. using the drying methods mentioned above.

After the conditioning process, the DMC catalyst can be separated from the reaction mixture. Suitable methods are centrifugation, extraction with an organic solvent which is immiscible with water, decantation or filtration. In one embodiment, the catalyst is separated by filtration. The catalyst may subsequently be washed with water or organic ligands like isopropanol.

The DMC catalyst can be used in polymerisation reactions in the form of a wet filter cake or in dry form. Drying can be effected in an oven and/or under vacuum at a temperature in the range of from 30 to 120° C., for instance 40 to 80° C. The catalyst can also be re-suspended in an organic starter compound or water. The concentration of the catalyst in such a suspension normally is 0.01 to 90 wt. %, for instance 0.01 to 50 wt. %, 0.1 to 20 wt. %, or even 1 to 10 wt. %.

Two effects of the process of the invention on the structure and the morphology of the DMC catalyst have been observed:

Formation of a new crystalline phase, evidenced by the appearance of additional reflections in the XRD diagram of the DMC catalyst, inter alia reflections corresponding to d-values of 9.00±0.04 Å, 6.52±0.04 Å, 5.41±0.04 Å, 4.51±0.04 Å. The reflections can be indexed according to an orthorhombic crystal system, the pattern being similar to that of orthorhombic $Zn_3[Fe(CN)_6]_2$. The present invention thus also provides a DMC catalyst comprising zinc and cobalt and crystallizing in the orthorhombic crystal system. The XRD diagram of the monoclinic DMC catalyst phase shows, inter alia, reflections corresponding to d-values of 5.20±0.04 Å, 4.80±0.04 Å, 3.75±0.04 Å, 3.60±0.04 Å, 3.46±0.04 Å, 2.82±0.04 Å, 2.77±0.04 Å, 2.61±0.04 Å, 2.40±0.04 Å. The material obtained after the conditioning process is essentially crystalline (crystallinity>70%, for instance >90%, or even >99%, as determined by XRD).

In one embodiment, the zinc content of the conditioned catalyst is 20 to 35 wt. %, or even 27 to 30 wt. %. In one embodiment the molar ratio zinc/cobalt is in the range of from 1.7 to 2.3, for instance 1.9 to 2.1.

The average crystal size of the DMC catalyst particles is increased by the treatment, as has been established by scanning electron microscopy (SEM). In an illustrative example, the crystal size in the treated sample, determined from SEM pictures, varied between 0.5 and 8 microns in length, the majority of the crystals having a length of from 3 to 6 microns, and 0.5 to 4 microns in width, the majority of the crystals having a width of from 1 to 3 microns. Before the treatment, the crystal size in the sample varied between 0.1 and 8 microns in length, the majority of the crystals having a length of from 1 to 4 microns, and 0.1 to 2 microns in width, the majority of the crystals having a width of from 0.5 to 2 microns.

The DMC catalyst of the present invention may be used in the polymerisation of epoxides. It may also be used in the copolymerisation of epoxides and lactones, anhydrides or carbon dioxide.

Examples of suitable lactones for the copolymerisation with epoxides are substituted or unsubstituted lactones having 4-membered or larger rings, such as β-propiolactone, δ-valerolactone, ε-caprolactone, methyl-ε-caprolactone, β,β-dimethyl-β-propiolactone, β-methyl-β-propiolactone, α-methyl-β-propiolactone, α,α-bis(chloromethyl) propiolactone, methyoxy-ε-caprolactone, ethoxy-ε-caprolactone, cyclohexyl-ε-caprolactone, phenyl-ε-caprolactone, benzyl-ε-caprolactone, ζ-enantholactone, η-caprylolactone, α,β,γ-trimethoxy-δ-valerolactone, or β-butyrolactone, and mixtures thereof. In one particular embodiment, ε-caprolactone is used.

Examples of suitable anhydrides for the copolymerisation with epoxides are cyclic anhydrides, substituted or unsubstituted, having 5-membered or larger rings, such as maleic anhydride, succinic anhydride, phthalic anhydride, itaconic anhydride, cis-1,2,3,6-tetrahydrophthalic anhydride. In one embodiment, maleic anhydride, succinic anhydride or phthalic anhydride are used. In one particular embodiment, substituted succinic anhydrides like alkenyl succinic anhydrides having carbon-chains comprising from 6 to 20 carbon atoms are used.

When the DMC catalyst of the present invention is utilised in the production of polyether polyols by ring-opening polymerisation of epoxides, it can be used at concentrations of less than 100 ppm, for example less than 75 ppm, or even 50 ppm or less, based on the total amount of polyol produced. In comparison to similar catalysts which have not been hydrothermally treated, the DMC catalysts of the invention yield polyol products having lower viscosity.

It will be understood that the features mentioned above and those described hereinafter can be used not only in the combination specified but also in other combinations or on their own, without departing from the scope of the present invention.

The present invention will now be described in more detail in the examples below. It is to be understood that the examples are not intended to limit the scope of the present invention and are merely an illustration of a preferred embodiment of the invention.

EXAMPLES

Catalyst Preparation and Conditioning

Preparation of Hexacyanocobaltic Acid (according to U.S. Pat. No. 6,689,710 B2)

7 l of strongly acidic ion exchange resin in the sodium form (Amberlite® 252 Na, Rohm and Haas) were placed in an ion exchange column (length 1 m, volume 7.7 l). The ion exchange resin was subsequently converted into the H form by passing 10% hydrochloric acid through the ion exchange column at a rate of 2 bed volumes per hour for 9 hours, until the sodium content in the eluate was less than 1 ppm. The ion exchange resin was subsequently washed with water until neutral.

The regenerated ion exchange resin was then used for preparing an essentially alkali-free hexacyanocobaltic acid. For this purpose, a 0.24 molar solution of potassium hexacyanocobaltate in water was passed through the ion exchange resin at a rate of 1 bed volume per hour. After 2.5 bed volumes, the potassium hexacyanocobaltate solution was replaced by water. The 2.5 bed volumes obtained had a mean hexacyanocobaltic acid content of 4.5% by weight and alkali metal contents of less than 1 ppm.

The hexacyanocobaltic acid solutions used for the further examples were appropriately diluted with water.

Catalyst A (Comparative):
(according to U.S. Pat. No. 6,689,710 B2)

16,000 g of aqueous hexacyanocobaltic acid (cobalt content: 9 g/l) were placed in a 30 l stirred vessel equipped with a propeller stirrer, immersed tube for introduction of the metal salt solution, pH probe and light scattering probe and were heated to 50° C. while stirring. Subsequently, while stirring at a stirring power of 0.4 W/l, 9,224 g of aqueous zinc acetate dihydrate solution (zinc content: 2.6% by weight) which had likewise been heated to 50° C. were metered in over a period of 15 minutes.

The molar ratio zinc:cobalt reached at the end of the precipitation was 1.5:1. The solid present in the precipitation suspension showed an X-ray diffraction pattern which could be indexed according to the cubic crystal system.

351 g of Pluronic® PE 6200 (BASF SE) were added to this suspension and the mixture was stirred for another 10 minutes.

A further 3,690 g of aqueous zinc acetate dihydrate solution (zinc content: 2.6% by weight) were subsequently metered in over a period of 5 minutes while stirring at a stirring power of 0.4 W/l.

The molar ratio zinc:cobalt at this point in time was 2.1:1, and the pH was 4.02. The suspension was stirred for another two hours. The pH dropped from 4.02 to 3.27 during this time and then remained constant. The precipitation suspension obtained in this way was subsequently filtered and the solid was washed on the filter with 6 times the cake volume of water.

The XRD pattern of the catalyst obtained displayed reflections at d-values of 8.45 Å (4%), 6.40 Å (2%), 6.16 Å (7%), 5.60 Å (5%), 5.20 Å (100%), 5.01 Å (3%), 4.80 Å (45%), 4.72 Å (7%), 4.23 Å (7%), 4.11 Å (5%), 4.05 Å (4%), 3.91 Å (9%), 3.75 Å (25%), 3.60 Å (44%), 3.46 Å (42%), 3.34 Å (5%), 3.23 Å (6%), 3.08 Å (5%), 2.82 Å (13%), 2.77 Å (15%), 2.70 Å (5%), 2.61 Å (40%), 2.40 Å (16%), 2.25 Å (16%) 2.04 Å (14%), 1.88 Å (13%), where the values in brackets represent the relative intensity of the respective reflection.

Catalyst B:

15 g of Catalyst A prepared as above were suspended in 150 ml of distilled water and the suspension obtained was transferred into a stainless steel autoclave. The autoclave was purged with nitrogen gas. The reaction mixture was stirred at 700 rpm and heated to 160° C. within 30 min to generate an internal pressure of approximately 6.2 bar. The pressure was adjusted to 13.6 bar by adding pressurized nitrogen. The mixture was agitated at 160° C. and 13.6 bar for 15 h and then allowed to cool to ambient temperature. The pressure was released, and the catalyst was isolated by filtration.

Elemental analysis of the dried catalyst by AAS showed a Zn-content of 30 wt. %. The XRD pattern of the catalyst showed additional reflections corresponding to d-values of 9.00 Å, 6.52 Å, 5.41 Å, and 4.51 Å. Particle size of the catalyst, as determined from SEM pictures, was 0.5 to 8 micron, with a maximum between 3 and 6 micron.

Catalyst C:

15 g of Catalyst A prepared as above were suspended in 150 ml of distilled water and the suspension obtained was transferred into a stainless steel autoclave. The autoclave was purged with nitrogen gas. The reaction mixture was stirred at 700 rpm and heated to 160° C. within 30 min to generate an internal pressure of approximately 6.2 bar. The pressure was adjusted to 158 bar by adding pressurized nitrogen. The mixture was agitated at 160° C. and 158 bar for 15 h and then allowed to cool to ambient temperature. The pressure was released, and the catalyst was isolated by filtration.

Elemental analysis of the dried catalyst by AAS showed a Zn-content of 27 wt. %. The XRD pattern of the catalyst showed additional reflections corresponding to d-values of 9.00 Å, 6.52 Å, 5.41 Å, and 4.51 Å.

Polymerisation Examples

Example 1

Comparative

Catalyst A at 70 ppm Catalyst Concentration

A 300 ml autoclave was charged with 40 g of PPG (OH#=100, F=1.98) and 70 ppm, relative to the total amount of polyol product, of Catalyst A. The reactor was heated to 130° C. and flushed twice with nitrogen. Then the reaction mixture was vacuum dried for 30 minutes and 4.8 ml of propylene oxide were added. Activation time of the catalyst was 3 minutes. After reaching constant pressure, the temperature was decreased to 100° C. and another 145.8 ml of PO were added. After completion of the polymerisation, the reaction mixture was vacuum stripped for 30 minutes and the reactor was drained. 182 g of product with the following specifications were obtained:

OH#=22.9 mg KOH/g
Viscosity@25° C.=3,541 mPas

Example 2

Catalyst B at 70 ppm Catalyst Concentration

A 300 ml autoclave was charged with 40 g of PPG (OH#=100, F=1.98) and 50 ppm of Catalyst B. The reactor was heated to 130° C. and flushed twice with nitrogen. Then the reaction mixture was vacuum dried for 30 minutes and 4.8 ml of propylene oxide were added. Activation time of the catalyst was 3 minutes. After reaching constant pressure, the temperature was decreased to 100° C. and another 145.8 ml of PO were added. After completion of the polymerisation, the reaction mixture was vacuum stripped for 30 minutes and the reactor was drained. 181 g of product with the following specifications was obtained:

OH#=22.8 mg KOH/g
Vicosity@25° C.=1,673 mPas

Example 3

Catalyst B at 50 ppm Catalyst Concentration

A 300 ml autoclave was charged with 40 g of PPG (OH#=100, F=1.98) and 50 ppm of Catalyst B. The reactor was heated to 130° C. and flushed twice with nitrogen. Then the reaction mixture was vacuum dried for 30 minutes and 4.8 ml of propylene oxide were added. Activation time of the catalyst was 3 minutes. After reaching constant pressure, the temperature was decreased to 100° C. and another 145.8 ml of PO were added. After completion of the polymerisation, the reaction mixture was vacuum stripped for 30 minutes and the reactor was drained. 180 g of product with the following specifications was obtained:

OH#=22.7 mg KOH/g
Vicosity@25° C.=2,059 mPas

Example 4

Catalyst C at 70 ppm Catalyst Concentration

A 300 ml autoclave was charged with 40 g of PPG (OH#=100, F=1.98) and 70 ppm of Catalyst C. The reactor was heated to 130° C. and flushed twice with nitrogen. Then the reaction mixture was vacuum dried for 30 minutes and 4.8 ml of propylene oxide were added. Activation time of the catalyst was 2 minutes. After reaching constant pressure, the temperature was decreased to 100° C. and another 145.8 ml of PO were added. After completion of the polymerisation, the reaction mixture was vacuum stripped for 30 minutes and the reactor was drained. 179 g of product with the following specifications was obtained:

OH#=22.9 mg KOH/g
Vicosity@25° C.=1,486 mPas

Example 5

Catalyst C at 50 ppm Catalyst Concentration

A 300 ml autoclave was charged with 40 g of PPG (OH#=100, F=1.98) and 50 ppm of DMC catalyst. The reactor was heated to 130° C. and flushed twice with nitrogen. Then the reaction mixture was vacuum dried for 30 minutes and 4.8 ml of propylene oxide were added. After reaching constant pressure, the temperature was decreased to 100° C. and another 145.8 ml of PO were added. After completion of the polymerisation, the reaction mixture was vacuum stripped for 30 minutes and the reactor was drained. 180 g of product with the following specifications was obtained:

OH#=23.2 mg KOH/g
Vicosity@25° C.=1,755 mPas

TABLE 1

(summary of polymerization examples 1-5).

| Catalyst/Example | Catalyst load [ppm] | Yield [g] | OH# [mg KOH/g] | Viscosity [mPas] |
|---|---|---|---|---|
| A/1 | 70 | 182 | 22.9 | 3,541 |
| B/2 | 70 | 181 | 22.8 | 1,673 |
| B/3 | 50 | 180 | 22.7 | 2,059 |
| C/4 | 70 | 179 | 22.9 | 1,486 |
| C/5 | 50 | 180 | 23.2 | 1,755 |

As can be seen from table 1, the DMC catalysts according to the invention afforded polyether polyol products with lower viscosity values at even <100 ppm catalyst loading, as compared to catalysts, which had not been hydrothermally treated.

Example 6

Preparation of a 12 k Diol Using Catalyst C

A 6 l autoclave was charged with 855.0 g of PPG (OH#=27.8; F=1.98) and 160 ppm (relative to the total amount of polyol product) of Catalyst C. The reactor was heated to 125° C. and flushed twice with nitrogen. Then the reaction mixture was vacuum dried for 60 minutes. 4,233.4 g of propylene oxide and 16.5 g of monopropylene glycol (1,2 propanediol) were added (feed rate monopropylene glycol: 20.7 g/h; feed rate propylene oxide: 1,800 g/h). After addition of the complete amount of monopropylene glycol the propylene oxide feed rate was reduced to 900 g/h. After completion of the polymerisation, the reaction mixture was vacuum stripped for 45 minutes and the reactor was drained. 5,085 g of product with the following specifications was obtained:

OH#=9.4 mg KOH/g
Viscosity@25° C.=6,481 mPas

Example 7

Preparation of a 8 k Diol using Catalyst C

A 6 l autoclave was charged with 1,130.3 g of PPG (OH#=27.8; F=1.98) and 95 ppm (relative to the total amount of polyol product) of Catalyst C. The reactor was heated to 125° C. and flushed twice with nitrogen. Then the reaction mixture was vacuum dried for 60 minutes. 3,348.3 g of propylene oxide and 21.4 g of monopropylene glycol (1,2 propanediol) were added (feed rate monopropylene glycol: 20.7 g/h; feed rate propylene oxide: 1,800 g/h). After addition of the complete amount of monopropylene glycol the propylene oxide feed rate was reduced to 900 g/h. After completion of the polymerisation, the reaction mixture was vacuum stripped for 45 minutes and the reactor was drained. 4,487 g of product with the following specifications was obtained:

OH#=15.4 mg KOH/g
Viscosity@25° C.=1,247 mPas

The invention claimed is:
1. A method for conditioning a DMC catalyst, the method comprising:
heating a suspension comprising a DMC catalyst in a dispersing medium under a gas atmosphere, a gas of the gas atmosphere being selected from the group consisting of nitrogen, carbon monoxide, carbon dioxide, water, and a noble gas, at a temperature in a range of from 140 to 270° C., and a pressure of 1 to 300 bar, for a period of time in a range of from 1 min to 24 hrs; and separating a conditioned DMC catalyst from said suspension.

2. The method of claim 1, further comprising:
stirring the suspension at a rate of 0 to 3,000 rpm.

3. The method of claim 2, wherein the stirring is carried out with a stirring power in a range from 0 to 5 W/l.

4. The method of claim 1, wherein the DMC catalyst has a formula:

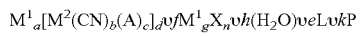

wherein:
- $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{2+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $La^{3+}$, $Ce^{3+}$, $Ce^{4+}$, $Eu^{3+}$, $Mg^{2+}$, $Ti^{3+}$, $Ti^{4+}$, $Ag^{+}$, $Rh^{1+}$, $Ru^{2+}$, $Ru^{3+}$, and $Pd^{2+}$;
- $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, and $Ir^{3+}$;
- $M^1$ and $M^2$ are different;
- A is an anion selected from the group consisting of a halide, hydroxide, sulfate, carbonate, cyanide, thiocyanate, isocyanate, cyanate, carboxylate, oxalate, and nitrate;
- X is an anion selected from the group consisting of a halide, hydroxide, sulfate, carbonate, cyanide, thiocyanate, isocyanate, cyanate, carboxylate, oxalate, and nitrate;
- L is at least one water-miscible ligand selected from the group consisting of an alcohol, an aldehyde, a ketone, an ether, a polyether, an ester, a polyester, a polycarbonate, a urea, an amide, a nitrile, and a sulfide;
- P is an organic additive selected from the group consisting of a polyether, a polyester, a polycarbonate, a polyalkylene glycol sorbitan ester, a polyalkylene glycol glycidyl ether, a polyacrylamide, poly(acrylamide-co-acrylic acid), polyacrylic acid, poly(acrylamide-co-maleic acid), polyacrylonitrile, a polyalkyl acrylate, a polyalkyl methacrylate, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), an oxazoline polymer, a polyalkylene imine, a maleic acid and maleic anhydride copolymer, hydroxyethyl cellulose, a polyacetate, an ionic surface-active and interface-active compound, a bile acid and a salt, ester and amide thereof, a carboxylic ester of a polyhydric alcohol, and a glycoside; and a, b, d, g and n are each an integer or a fraction greater than zero, and c, f, e, h, and k are each an integer or a fraction greater than or equal to zero, wherein at least one number is different from zero; with the proviso that a, b, c, d, g, and n are chosen so that the compound is electrically neutral.

5. The method of claim 4, wherein $M^1$ is $Zn^{2+}$; $M^2$ is $Co^{3+}$; A is cyanide; and X is acetate.

6. The method of claim 4, wherein the DMC catalyst is a crystalline catalyst.

7. The method of claim 6, wherein the DMC catalyst crystallizes in a monoclinic crystal system.

8. The method of claims 6, wherein the DMC catalyst exhibits a platelet-like morphology.

9. The method of claim 1, wherein the dispersing medium is water.

10. The method of claim 1, wherein the gas atmosphere comprises nitrogen.

11. The method of claim 1, wherein the gas atmosphere comprises water.

12. The method of claim 1, wherein a concentration of the DMC catalyst in the suspension is 0.05 to 90% by weight, based on a total mass of the suspension.

13. The method of claim 1, further comprising, prior to the heating:
reacting a first aqueous solution comprising hexacyanocobaltic acid with a second aqueous solution comprising zinc acetate dehydrate, to obtain the DMC catalyst.

14. The method of claim 13, wherein the DMC catalyst is not isolated between the reacting and the heating.

15. The method of claim 14, wherein the reacting and heating are carried out in one and the same vessel.

16. The method of claim 13, further comprising, between the reacting and the heating:
isolating the DMC catalyst.

17. The method of claim 1, further comprising, prior to the heating:
reacting a first aqueous solution comprising a cobalt salt with a second aqueous solution comprising a zinc salt and a third aqueous solution comprising an alkali cyanide, to obtain the DMC catalyst.

18. The method of claim 17, wherein the DMC catalyst is not isolated between the reacting and the heating.

19. The method of claim 18, wherein the reacting and the heating are carried out in one and the same vessel.

20. The method of claim 17, further comprising, between the reacting and the heating:
isolating the DMC catalyst.

* * * * *